United States Patent
Kim

(10) Patent No.: US 8,465,834 B2
(45) Date of Patent: Jun. 18, 2013

(54) CONDUCTIVE PRESSURE SENSITIVE ADHESIVE TAPE

(75) Inventor: Sun-Ki Kim, Gunpo (KR)

(73) Assignee: Joinset Co., Ltd. (KR)

( * ) Notice: Subject to any disclaimer, the term of this patent is extended or adjusted under 35 U.S.C. 154(b) by 61 days.

(21) Appl. No.: 12/523,310

(22) PCT Filed: May 18, 2007

(86) PCT No.: PCT/KR2007/002421
§ 371 (c)(1),
(2), (4) Date: Jul. 15, 2009

(87) PCT Pub. No.: WO2008/088107
PCT Pub. Date: Jul. 24, 2008

(65) Prior Publication Data
US 2010/0086777 A1    Apr. 8, 2010

(30) Foreign Application Priority Data

Jan. 17, 2007 (KR) ............... 10-2007-0005256
Feb. 26, 2007 (KR) ............... 10-2007-0018924

(51) Int. Cl.
*B32B 7/12* (2006.01)
(52) U.S. Cl.
USPC .................. 428/343; 428/354; 428/66.6
(58) Field of Classification Search
USPC .................................. 428/343, 66.6
See application file for complete search history.

(56) References Cited

U.S. PATENT DOCUMENTS

| | | | | |
|---|---|---|---|---|
| 3,404,061 A | * | 10/1968 | Shane et al. | 428/143 |
| 3,962,508 A | * | 6/1976 | Nakanose | 428/169 |
| 5,953,628 A | * | 9/1999 | Kawaguchi | 438/635 |
| 6,235,385 B1 | | 5/2001 | Lee | |
| 6,432,527 B1 | * | 8/2002 | Perez et al. | 428/343 |
| 2002/0021997 A1 | * | 2/2002 | Taomoto et al. | 423/448 |
| 2002/0142157 A1 | | 10/2002 | Lee | |
| 2003/0059607 A1 | * | 3/2003 | Schumann et al. | 428/355 N |
| 2004/0126597 A1 | * | 7/2004 | Cohen et al. | 428/458 |
| 2004/0191491 A1 | * | 9/2004 | Sugaya et al. | 428/209 |
| 2005/0123721 A1 | * | 6/2005 | Heikaus et al. | 428/137 |
| 2005/0239940 A1 | * | 10/2005 | Shima et al. | 524/439 |

FOREIGN PATENT DOCUMENTS

| KR | 1020020076513 A | 10/2002 |
|---|---|---|
| KR | 200380753 B1 | 7/2005 |
| KR | 1020060126191 A | 12/2006 |

OTHER PUBLICATIONS

International Search Report dated Oct. 15, 2007, for International Patent Application No. PCT/KR2007/002421.

* cited by examiner

*Primary Examiner* — Callie Shosho
*Assistant Examiner* — Samir Shah
(74) *Attorney, Agent, or Firm* — Park & Associates IP Law, P.C.

(57) ABSTRACT

A conductive pressure sensitive adhesive tape is provided. The conductive pressure sensitive adhesive tape includes a first metal foil, a polymer film attached to a surface of the first metal foil with a polymer binder interposed therebetween, a second metal foil attached to a surface of the polymer film with a polymer binder interposed therebetween, and a polymer adhesive layer formed on a backside of at least one of the first and second metal foils.

10 Claims, 3 Drawing Sheets

CONDUCTIVE PRESSURE SENSITIVE ADHESIVE TAPE

TECHNICAL FIELD

The present invention relates to a conductive pressure sensitive adhesive tape, and more particularly, to a conductive pressure sensitive adhesive tape having good conductivity by forming metal foils on both upper and lower sides thereof, not easily being deformed as it has good tear strength in virtue of material disposed therein, having good flexibility, and being fabricated at relatively low cost.

BACKGROUND ART

Typically, a conductive pressure sensitive adhesive tape is divided into an electrically conductive pressure sensitive adhesive tape and a thermally conductive pressure sensitive adhesive tape, and classified into a conductive pressure sensitive adhesive tape having conductivity along only length direction and a conductive pressure sensitive adhesive tape having conductivity along both length and thickness directions. For example, a conductive pressure sensitive adhesive tape configured with a conductive adhesive in which a metal foil such as copper foil and a metal powder such as nickel powder are mixed has both thermal conductivity and electrical conductivity along its length and thickness directions. However, a conductive pressure sensitive adhesive tape configured with a conductive adhesive in which a metal foil and an electrically insulating oxidized ceramic powder are mixed, e.g., a conductive pressure sensitive adhesive tape configured with a conductive adhesive with alumina mixed, has thermal conductivity along its length and thickness directions but does not have electrical conductivity along its thickness direction. In general, the conventional conductive pressure sensitive adhesive tape is configured with a conductive base such as a metal foil, and an adhesive suitable for its purpose.

In general, the conductive pressure sensitive adhesive tape is used for conducting electricity, shielding electromagnetic wave, or transferring heat. The conductive pressure sensitive adhesive tape having conductivity along both length and thickness directions is more expensive than the conductive pressure sensitive adhesive tape having conductivity along only length direction.

In a related art, the conductive pressure sensitive adhesive tape typically includes a conductive base and an adhesive. Herein, a metal foil formed of aluminum or copper with good thermal and electrical conductivity is mainly used as the conductive base. The adhesive is selected among a thermally and electrically conductive adhesive, a thermally conductive but electrically non-conductive adhesive, and a thermally and electrically non-conductive adhesive.

When the conductive pressure sensitive adhesive tape is overlapped and wound around a high frequency cable, it may be used as an electromagnetic shielding material, to thereby prevent electromagnetic wave generated inside the cable from not being emitted outward or prevent external electromagnetic noise from not being inputted into the cable. That is, the conductive pressure sensitive adhesive tape is formed of electrically conductive material, and thus plays a role in reflecting most of electromagnetic wave incident thereto.

Alternatively, the conductive pressure sensitive adhesive tape may be used as an electric grounding wire that electrically connects two points. Namely, it is possible to electrically connect objects with reliability using the conductive pressure sensitive adhesive tape.

Alternatively, the conductive pressure sensitive adhesive tape is used for transferring heat, and thus it may be used for connecting heat pipes of a refrigerator or a stove, or used as a heatsink part of an electronic device.

DISCLOSURE OF INVENTION

Technical Problem

In a related art, a conductive pressure sensitive adhesive tape has been used, which is formed by coating a conductive acryl adhesive in which conductive powder such nickel is mixed, on a metal foil such as aluminum or copper foil having a thickness ranging from approximately 0.03 mm to 0.08 mm. However, this conductive pressure sensitive adhesive tape formed of the metal foil only is disadvantageous in that it is easily torn due to low tear strength, a man is prone to have his hand cut due to a sharp cut section, and further it is easily wrinkled. Moreover, although the adhesive tape formed of aluminum foil is cheaper than the adhesive tape formed of copper foil, there is a drawback that it is difficult to solder the adhesive tape formed of aluminum foil. Also, the aluminum and copper foils do not shield magnetic wave effectively because they are nonmagnetic metal. When a magnetic metal adhesive tape formed of nickel foil is used for shielding magnetic wave, its price becomes more expensive.

As another related art technology, a conductive fiber adhesive tape has been used, which is formed by coating a conductive acryl adhesive on a polyester (PET) fiber with approximately 0.08 mm thick, wherein the conductive acryl adhesive is configured such that nickel powder or the like is mixed in an electroless-plated conductive fiber. The conductive fiber adhesive tape is disadvantageous in that its price is too expensive because of using the conductive fiber, and its cut section is fluffy. Further, since the conductive fiber has poorer electrical and thermal conductivity than that of the metal foil, the conductive fiber adhesive tape shows poor electrical and thermal conductivity compared to the conductive pressure sensitive adhesive tape configured with a metal foil. Also, it is difficult to use the conductive fiber adhesive tape at 100° C. or higher in general, and it is difficult to solder it as well.

As yet another related art technology, a conductive PET adhesive tape has been used, which is formed by attaching a metal foil such as aluminum foil or depositing metal such as aluminum on one side of a PET film with approximately 0.03 mm thick, and by coating a conductive acryl adhesive with a conductive powder such as nickel powder mixed on the other side of the PET film. However, there is a drawback that the conductive PET adhesive tape has electrically and thermally poor conductivity because the conductive adhesive is disposed on the PET film having electrically and thermally poor conductivity. In addition, since a metal layer is formed on only one side of the PET film, there is a disadvantage that it is difficult to provide a conductive pressure sensitive adhesive tape having good electrical conductivity in vertical direction. Also, since the PET film is molten at a predetermined temperature or higher and easily stretched by force applied thereto because the metal layer is formed on only one side of the PET film, the processability of the conductive PET adhesive tape is poor beyond the predetermined temperature. Moreover, when mechanical pressure is applied on the conductive PET adhesive tape and then removed, the conductive PET adhesive tape is restored to an original shape due to repulsive force of the PET film having a predetermined thickness, which makes it difficult to form embossed shape on the surface of the conductive pressure sensitive adhesive tape.

As even another related art technology, according to the Korean Utility Model Application No. 2005-000049 that was filed by the present applicant and registered, a vertical conductive pressure sensitive adhesive tape has been introduced in which a conductive adhesive is filled into a hole of a PET film so as to connect the metal foil and the conductive adhesive vertically. However, this vertical conductive adhesive tape is disadvantageous in that it is difficult to fill the conductive adhesive into the hole of the PET film, and it has poor conductivity because a metal foil with a predetermined thickness is formed on only one side of the vertical conductive adhesive tape. Also, there is a drawback that it cannot provide a solderable conductive pressure sensitive adhesive tape with low price because it is easily stretched by heat and configured with only one metal.

Technical Solution

An object of the present invention is to provide a conductive pressure sensitive adhesive tape having good thermal and electrical conductivity.

Another object of the present invention is to provide a conductive pressure sensitive adhesive tape having flexibility that is not easily torn in virtue of good tear strength.

A further another object of the present invention is to provide a conductive pressure sensitive adhesive tape that is not stretched by heat at high temperature.

A still another object of the present invention is to provide a conductive pressure sensitive adhesive tape capable of easily performing an embossing marking process by mechanical pressure.

An even another object of the present invention is to provide an economic conductive pressure sensitive adhesive tape that can be used by selecting a moderate-priced material suitable for its purpose.

A yet another object of the present invention is to provide a conductive pressure sensitive adhesive tape that also has conductivity along vertical direction depending on its use.

Advantageous Effects

A conductive pressure sensitive adhesive tape has good tear strength because a polymer film is disposed therein. Accordingly, it is not easily torn, and it has flexibility as well.

A graphite sheet is disposed inside a conductive pressure sensitive adhesive tape, and thus the conductive pressure sensitive adhesive tape is not stretched by heat. Therefore, the adhesive tape can be used at high temperature, and it is possible to form an embossed shape by mechanical force using a roller or the like.

Since the thickness of each of the upper and lower metal foils is small, there is no concern that a man has his hand cut due to cut sections of the metal foils.

Anti-oxidation process is performed on the surface of the metal foil exposed to the outside so that the adhesive tape is hardly oxidized.

When the adhesive tape is used as being overlapped and wound, the conductivity crosses over overlapping surfaces so that it is possible to provide conductivity in vertical direction.

By forming holes and filling conductive polymer adhesive into the holes or by vertically connecting the metal foils to each other by means of the holes, it is possible to provide conductivity in vertical direction.

In case of forming the holes vertically, internal electromagnetic wave can leak out to the outside through theses holes if necessary.

It is possible to easily remove the adhesive layer when detaching the adhesive tape from the object.

The thermal conductivity can be improved in surface direction of the adhesive tape when applying the graphite sheet.

BRIEF DESCRIPTION OF THE DRAWINGS

The above objects and other advantages of the present invention will become more apparent by describing in detail preferred embodiments thereof with reference to the attached drawings in which.

BEST MODE FOR CARRYING OUT THE INVENTION

Figure 1:
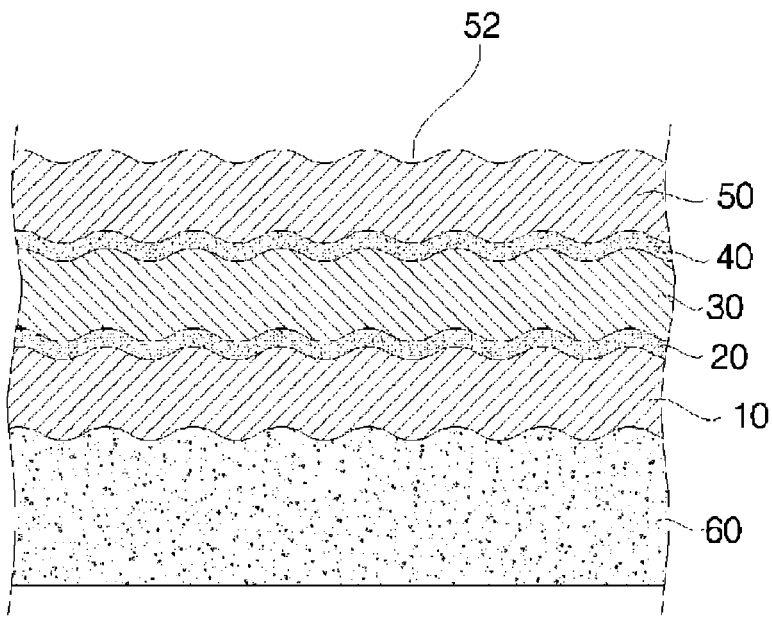
FIG. 1 is a sectional view of a conductive pressure sensitive adhesive tape according to one embodiment of the present invention.

According to an aspect of the present invention, there is provided a conductive pressure sensitive adhesive tape including: a first metal foil; a polymer film attached to a surface of the first metal foil with a polymer binder interposed therebetween; a second metal foil attached to a surface of the polymer film with a polymer binder interposed therebetween; and a polymer adhesive layer formed on a backside of at least one of the first and second metal foils.

According to this constitution, metal foils such as aluminum or copper foils are formed on both sides of the adhesive tape so that electrical and thermal conductivity is excellent. The conductive pressure sensitive adhesive tape has good tear strength because the polymer film is disposed therein. Accordingly, it is not easily torn, and it has flexibility as well.

According to another aspect of the present invention, there is provided a conductive pressure sensitive adhesive tape including: a first metal foil; a polymer film attached to a surface of the first metal foil with a polymer binder interposed therebetween; a second metal foil attached to a surface of the polymer film with a polymer binder interposed therebetween; and a polymer adhesive layer formed on a backside of at least one of the first and second metal foils, wherein at least one of the first and second metal foils is a rolled metal foil.

According to this constitution, the conductive pressure sensitive adhesive tape has excellent flexibility in virtue of the rolled metal foil in addition to above-listed advantages.

According to further another aspect of the present invention, there is provided a conductive pressure sensitive adhesive tape including: a first metal foil; a graphite sheet attached to a surface of the first metal foil with a polymer binder interposed therebetween; a polymer film attached to a surface of the graphite sheet with a polymer binder interposed therebetween; a second metal foil attached to a surface of the polymer film with a polymer binder interposed therebetween; and a polymer adhesive layer formed on a backside of at least one of the first and second metal foils.

According to this constitution, the conductive pressure sensitive adhesive tape has excellent thermal and electrical conductivity, and good heat resistance. In addition, the conductive pressure sensitive adhesive tape is not stretched by heat, and particularly it has good thermal conductivity along surface direction rather than thickness direction.

According to further another aspect of the present invention, there is provided a conductive pressure sensitive adhesive tape including: a first metal foil; a first polymer film attached to a surface of the first metal foil with a polymer binder interposed therebetween; a graphite sheet attached to a surface of the first polymer film with a polymer binder interposed therebetween; a second polymer film attached to a surface of the graphite sheet with a polymer binder interposed therebetween; a second metal foil attached to a surface of the second polymer film with a polymer binder interposed therebetween; and a polymer adhesive layer formed on a backside of at least one of the first and second metal foils.

Mode for the Invention

Now, preferred embodiments of the present invention will be described in detail with reference to the accompanying drawings.

FIG. 1 is a sectional view of a conductive pressure sensitive adhesive tape according to one embodiment of the present invention.

Referring to FIG. 1, a lower aluminum or copper foil 10 is disposed at a lower position, and a polymer film 30 is attached to the lower aluminum or copper foil 10 with a polymer binder 20 interposed therebetween. An upper aluminum or copper foil 50 is attached to the polymer film 30 with a polymer binder 40 interposed therebetween. An adhesive layer 60 on which a pressure sensitive adhesive (PSA) is coated is formed on a backside of the lower aluminum or copper foil 10.

According to such a constitution of the conductive pressure sensitive adhesive tape, it shows good electrical and thermal conductivity because metal foils, i.e., the aluminum or copper foils, are formed on both upper and lower sides of the polymer film 30. Further, the polymer film 30 is disposed between the metal foils so that the conductive pressure sensitive adhesive tape is not easily torn in virtue of good tear strength and flexibility.

In addition, if the upper and lower metal foils are formed of different material, i.e., if one of the upper and lower metal foil is formed of aluminum and the other one is formed of copper, it is possible to reduce material cost on the whole and to solder it using the copper foil as well. If a magnetic substance such as nickel foil is formed on one side of the polymer film instead of a nonmagnetic substance such as aluminum or copper foil, it is advantageous in that it is possible to effectively shied magnetic field with low fabrication cost.

The upper and lower aluminum or copper foils 50 and 10 may use a rolled or electrolytically plated metal foil. Preferably, the upper and lower aluminum or copper foils 50 and 10 use a rolled metal foil with good flexibility of which a thickness is in the range of 0.006 mm to 0.020 mm, and an anti-oxidation process is performed on a metal surface. As the thickness of the metal foil 10 and 50 increases, the conductivity becomes good but its price becomes expensive and flexibility becomes poor. Since the copper foil has good thermal and electrical conductivity in comparison with the aluminum foil but its price is too expensive, it is preferable that the rolled aluminum foil be used as one of the upper and lower metal foils.

Preferably, the polymer binders 20 and 40 are coated to a thickness of 0.01 mm or smaller, thereby attaching the upper and lower aluminum or copper foils 50 and 10 to the polymer film 30. The polymer binders 20 and 40 is thinly coated so as to have little effect on conductivity, and a predetermined material should be appropriately selected and used depending on a kind of the metal foil 10 and 50 and a kind of the polymer film 30. When conductive polymer binders 20 and 40 are used for improving conductivity, the thickness of the adhesive may be increased due to the size of particles mixed into the adhesive.

A PET film is generally used as the polymer film 30 but alternatively a polyimide (PI) film may be used for high temperature adhesive. In addition, the rolled polymer film 30 is used to enhance the shear and tear strength of the conductive pressure sensitive adhesive tape. Since the polymer film 30 has poor conductivity, it is preferable to use a product having a thickness as small as possible within the allowable range of the tear strength, e.g., a product having a thickness in the range of approximately 0.006 mm to 0.015 mm.

When the metal foils 10 and 50 and the polymer film 30 are too thick, the flexibility of the conductive pressure sensitive adhesive tape becomes poor, and further its price becomes expensive. On the contrary, when they are too thin, it is easy to be torn.

An acryl adhesive is generally used as the polymer adhesive layer 60. Alternatively, a silicon rubber adhesive may be used for heat resistant purpose. It is preferable that the thickness of the polymer adhesive layer 60 be in the range of 0.02 mm to 0.06 mm. On occasion demands, a conductive powder such as nickel, carbon, alumina, and the like is mixed into the acryl or silicon rubber adhesive for making the adhesive have conductivity. In case of using nickel or carbon powder, the conductive adhesive layer 60 has both electrical and thermal conductivities. However, in case of using oxidized ceramic such as alumina powder, the conductive adhesive layer 60 has thermal conductivity only. The adhesive layer 60 can secure sufficient adhesive force and conductivity when it is formed to a thickness ranging from approximately 0.02 mm to 0.06 mm.

As for fabrication process of the conductive pressure sensitive adhesive tape, the polymer film 30 is attached to the metal foil 50, wherein the polymer binder 40 is interposed therebetween. Thereafter, the metal foil 10 is attached to the polymer film 30 with the polymer binder 20 interposed therebetween. Afterwards, the polymer adhesive is coated on the metal foil 10 to form the adhesive layer 60. The above-described fabrication process and fabrication technology are applied using typical well-known fabrication process of the adhesive tape.

Here, it is possible to form embossing markings using mechanical force such as a roller before forming the adhesive layer 60. Since the polymer film 30 has a thickness ranging from 0.006 mm to 0.015 mm, and the metal foil has a thickness ranging from 0.006 mm to 0.02 mm, an embossing can be easily formed. By forming the embossing 52, it is possible to reduce the wrinkle of the conductive pressure sensitive adhesive tape, and further to achieve an advantageous effect that its surface area is substantially increased.

At this point, it is possible to provide conductivity in vertical direction by deeply forming the embossing markings 52 such that the first metal foil 50 is in contact with the second metal foil 10. That is, when deeply forming the embossing markings, the metal foil 50 is well stretched and thinned because of good elongation property, and resultantly the thinned first metal foil 50 contacts with the thinned second metal foil 10, while the throughholes are formed in the polymer binders 20 and 40 and the polymer film 30 as the polymer film 30 and the polymer binder 20 and 40 are pressed by the mechanical force of the embossing tool such as a roller. Therefore, the pressure sensitive adhesive tape can have conductivity in vertical direction.

Meanwhile, although the present embodiment illustrates that the adhesive layer 60 is formed on the metal foil 10, the present invention is not limited to the above-listed one but the adhesive layer 60 may be formed on the other metal foil 50. According to circumstances, the adhesive layers 60 may be formed on the metal foils 50 and 10, respectively.

Figure 4:
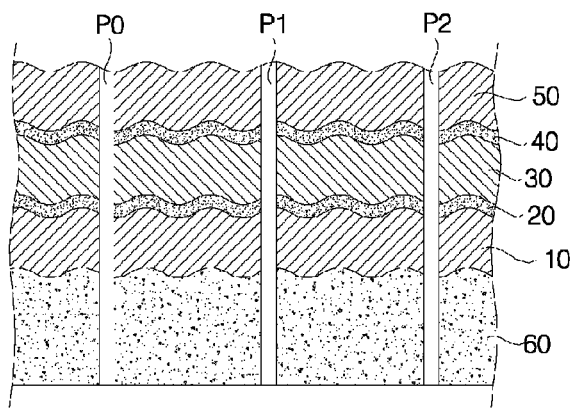
FIG. 4 is a sectional view illustrating a modified embodiment of the present invention.

In the present embodiment, though it is described that holes are not vertically formed in the metal foils 10 and 50, the polymer binders 20 and 40, and the polymer film 30, the present invention is not limited to it. Referring to FIG. 4, throughholes P0, P1 and P2 are vertically formed such that they penetrate the metal foils 10 and 50, the polymer binders 20 and 40, and the polymer film 30 except the polymer conductive adhesive layer 70. Thereafter, a conductive adhesive 60 is filled into the throughholes P0, P1 and P2 during the coating process of the polymer conductive adhesive layer 60, which makes it possible for the conductive pressure sensitive adhesive tape to have conductivity in vertical direction.

Figure 5:
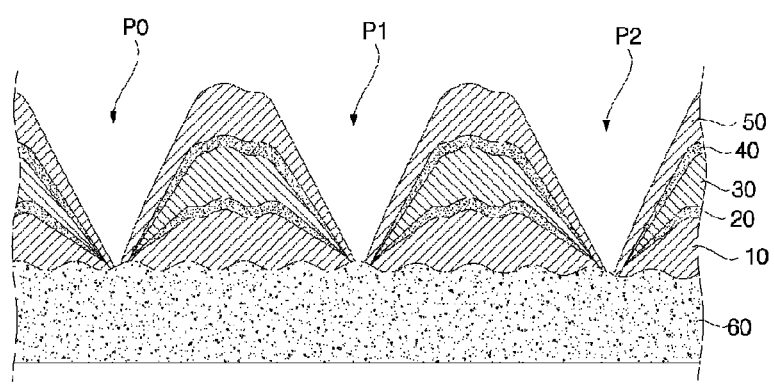
FIG. 5 is a sectional view illustrating an example of forming throughholes of FIG. 4.

Alternatively, it is possible for the conductive pressure sensitive adhesive tape to have conductivity in vertical direction without filling the conductive adhesive. Referring to FIG. 5, the conductive pressure sensitive adhesive tape is pressurized with a roller having sharply pointed protrusions to form the throughholes P0, P1 and P2 in the entire layers from the first metal 50 and to the polymer film 30 and the second metal foil 10. At this point, since the first metal foil 50 is well stretched because of good elongation property, the metal foil 50 connects with the metal foil 10 at edges of the throughholes P0, P1 and P2 so that it is possible to provide conductivity in vertical direction.

Preferably, the conductive pressure sensitive adhesive tape may be sold in a state that a release sheet (not shown), e.g., a release paper and a release film, is attached beneath the adhesive layer 60.

Figure 2:
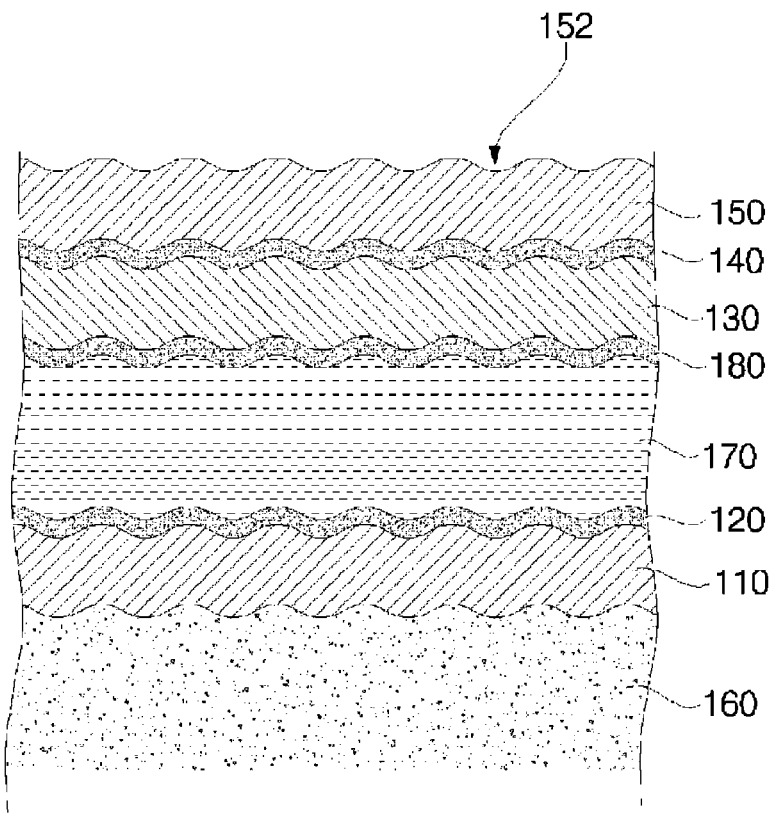
FIG. 2 is a sectional view of a conductive pressure sensitive adhesive tape according to another embodiment of the present invention.

FIG. 2 is a sectional view of a conductive pressure sensitive adhesive tape according to another embodiment of the present invention.

Referring to FIG. 2, a lower aluminum or copper foil 110 is disposed at lower position, and a graphite sheet 170 is attached to the surface of the lower aluminum or copper foil 110 with a polymer binder 120 interposed therebetween. A polymer film 130 is attached to the surface of the graphite sheet with a polymer binder 180 interposed therebetween. An upper aluminum or copper foil 150 is attached to the surface of the polymer film 130 with a polymer binder 140 interposed therebetween. An adhesive layer 160 on which a pressure sensitive adhesive (PSA) is coated is formed on a backside of the lower aluminum or copper foil 110.

According to such a constitution, there are several advantages besides the advantages of the previous embodiment. That is, since the graphite is included in the conductive pressure sensitive adhesive tape, the conductive pressure sensitive adhesive tape has good dimension stability as it is not stretched even if heat is applied thereto. In addition, it is possible to form embossing markings 152 on the conductive pressure sensitive adhesive tape by mechanical pressure.

The graphite sheet has advantageous properties such as excellent thermal and electrical conductivity, and good heat resistance. In particular, since the graphite sheet has good thermal conductivity in surface direction rather than thickness direction, it can be used suitably for the case that thermal conductivity along the surface direction is considered to be important.

The graphite sheet has the compressed structure in which graphite powders having purity greater than 95% are stacked, and it is preferable that the thickness of the graphite sheet be in the range of approximately 0.08 mm to 0.3 mm.

Meanwhile, when attaching the conductive pressure sensitive adhesive tape according to the embodiment of FIG. 2 on an object and then detaching it, the graphite sheet is easily separated in thickness direction in comparison with the adhesive force of the adhesive 160 so that the adhesive layer 160 may adhere to the object.

Figure 3:
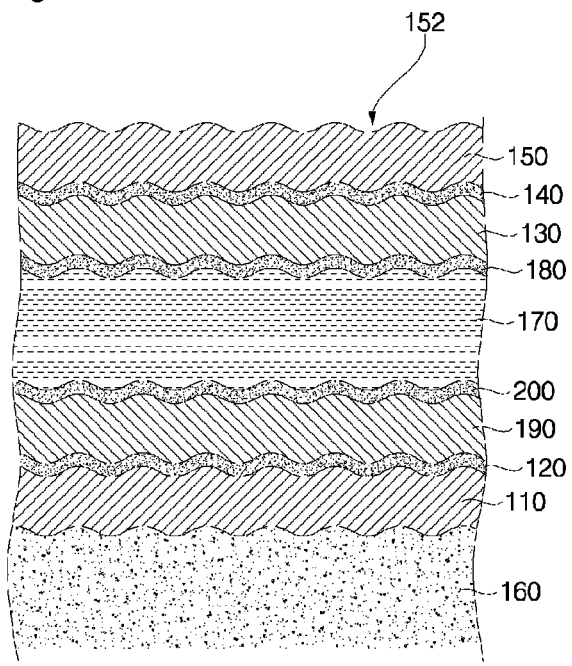
FIG. 3 is a sectional view of a conductive pressure sensitive adhesive tape according to further another embodiment of the present invention.

To prevent this possibility, referring to FIG. 3, a polymer film 190, which is the same as the polymer film 130, may be attached between the graphite sheet 170 and the aluminum or copper foil 110 with the polymer binders 120 and 200 interposed therebetween.

According to such a constitution, when attaching the conductive pressure sensitive adhesive tape on a facing object and detaching it, it is possible to partially reduce the possibility that the force for detaching the adhesive is transferred to the polymer film 190 and thus the graphite sheet 170 is separated in thickness direction. Even when the graphite sheet 170 is separated in thickness direction while the conductive pressure sensitive adhesive tape is detached, the adhesive layer 160 attached to the object can be easily detached using the polymer film 190.

In the above-described embodiments, the conductive silicon rubber (not shown) may be uniformly coated on the metal foil in a thickness range of approximately 0.1 mm to 0.4 mm where the adhesive layers 60 and 160 are not formed. That is, the cushioned conductive silicon rubber formed on the metal foil is disposed between facing objects, and increases the adherence between the facing object and the conductive pressure sensitive adhesive tape reliably, which improves the conductivity.

Also, in the above-described embodiments, the conductive pressure sensitive adhesive tape itself is nonconductive in vertical direction due to the polymer films 30, 130 and 190 disposed therein. However, although the conductive pressure sensitive adhesive tape is electrically non-conductive in vertical direction, it can have electrical conductivity in vertical direction when it is used as being wound around a cable because conductive portions are overlapped with each other vertically. That is, the conductive pressure sensitive adhesive tape has electrical conductivity in vertical direction depending on its use method thereof.

As similar to the embodiment of FIG. 4, the conductive pressure sensitive adhesive tape can have conductivity in vertical direction by forming holes in the polymer film.

Figure 6:
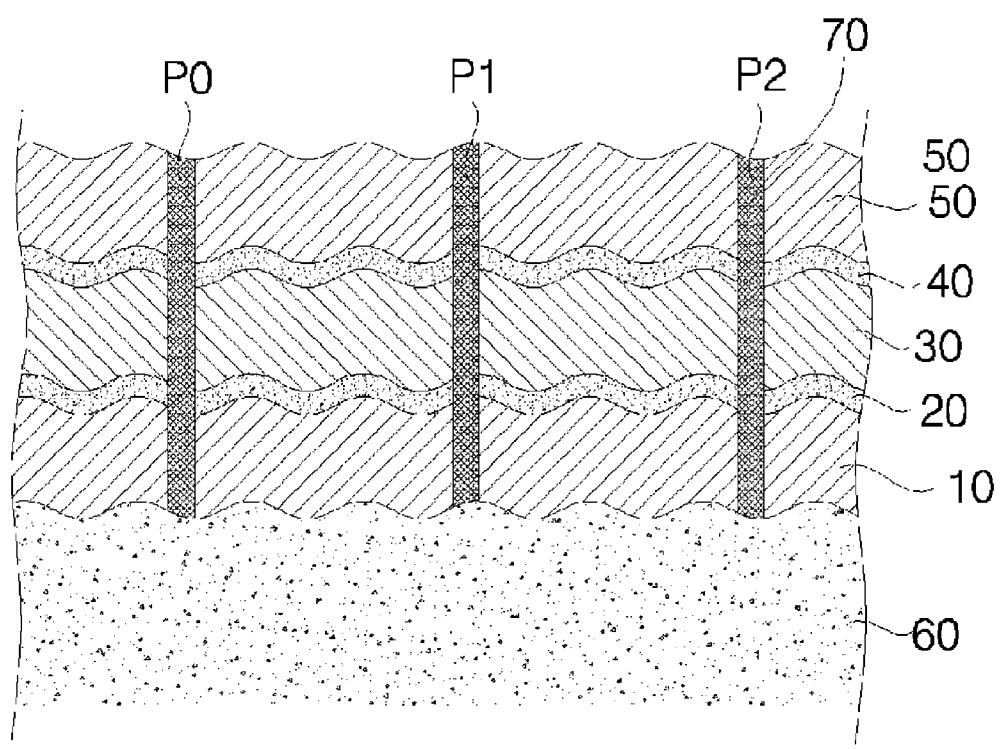
FIG. 6 is a sectional view illustrating another modified embodiment of the present invention.

FIG. 6 is a sectional view illustrating another modified embodiment of the present invention.

According to this modified embodiment, throughholes P0, P1 and P2 penetrating the upper and lower surfaces are formed. For example, when the adhesive tape is used as being wounded around an object such as a leaky cable, the conductive pressure sensitive adhesive tape can be utilized such that electromagnetic wave generated from the object leaks out.

As described above, the throughholes P0, P1 and P2 may, for example, be formed by punching the adhesive tape in thickness direction using a press or the like.

According to the present invention, there are several advantageous merits below.

Metal foils such as aluminum or copper foils are formed on both sides of an adhesive tape so that electrical and thermal conductivity is excellent.

Material for the metal foils is appropriately selected for purpose and used, which can reduce fabrication cost. That is, as aforementioned, it is possible to reduce the price by forming the copper foil on one side requiring soldering and the aluminum foil on the other side, respectively.

While the present invention has been described in detail, it should be understood that various changes, substitutions and alterations can be made hereto without departing from the spirit and scope of the invention as defined by the appended claims. For example, another metal foil such as nickel having good magnetic shielding performance may be used instead of aluminum or copper foil. Alternatively, the copper foil is formed on one side requiring soldering and the aluminum foil of low price is formed on the other side, which can reduce material cost. Also, the adhesive and the polymer film can be appropriately selected and used for the use purpose of the adhesive tape such as thermal conductivity and electrical conductivity. Further, holes can be formed for providing conductivity in vertical direction.

Thus, in consideration of such modification and change, the scope of the present invention is not limited to the above-described embodiments but it should be construed through claims below.

The invention claimed is:

1. A conductive pressure sensitive adhesive tape comprising:
   a first metal foil;
   a polymer film attached to a surface of the first metal foil with a polymer binder interposed therebetween;
   a second metal foil attached to a surface of the polymer film with a polymer binder interposed therebetween; and
   a polymer adhesive layer formed on a backside of the second metal foil,
   wherein at least one of the first and second metal foils is a rolled metal foil,
   wherein throughholes are formed from the first metal foil and through the polymer film and the second metal foil in a vertical direction of the conductive pressure sensitive adhesive tape, and a conductive adhesive is filled into the throughholes so that the first and second metal foils connect with each other via the throughholes.

2. The conductive pressure sensitive adhesive tape of claim 1, wherein the polymer adhesive layer is electrically conductive.

3. The conductive pressure sensitive adhesive tape of claim 2, wherein the throughholes are formed before forming the electrically conductive polymer adhesive layer on the backside of the conductive pressure sensitive adhesive tape.

4. The conductive pressure sensitive adhesive tape of claim 1, wherein an anti-oxidation is performed over the metal foil where the polymer adhesive layer is not formed.

5. The conductive pressure sensitive adhesive tape of claim 1, wherein a conductive silicon rubber is uniformly coated on the metal foil with a predetermined thickness where the polymer adhesive layer is not formed.

6. The conductive pressure sensitive adhesive tape of claim 1, further comprising a graphite sheet attached between said polymer film and said at least one of the first and second metal foils.

7. The conductive pressure sensitive adhesive tape of claim 6, further comprising another polymer film attached between said graphite sheet and said at least one of the first and second metal foils.

8. The conductive pressure sensitive adhesive tape of claim 1, wherein the first and second metal foils are formed with different metal.

9. The conductive pressure sensitive adhesive tape of claim 8, wherein one of the first and second metal foils is formed with aluminum, and the other is formed with copper.

10. The conductive pressure sensitive adhesive tape of claim 8, wherein one of the first and second metal foils is formed with aluminum or copper, and the other is formed with nickel.

* * * * *